US011988025B2

(12) United States Patent
Yang et al.

(10) Patent No.: US 11,988,025 B2
(45) Date of Patent: May 21, 2024

(54) CONCEALED DOOR HANDLE AND VEHICLE

(71) Applicant: NIO TECHNOLOGY (ANHUI) CO., LTD, Hefei (CN)

(72) Inventors: Yanzhou Yang, Hefei (CN); Ke Shen, Hefei (CN); Ping Ai, Hefei (CN)

(73) Assignee: NIO TECHNOLOGY (ANHUI) CO., LTD, Hefei (CN)

( * ) Notice: Subject to any disclaimer, the term of this patent is extended or adjusted under 35 U.S.C. 154(b) by 0 days.

(21) Appl. No.: 17/713,502

(22) Filed: Apr. 5, 2022

(65) Prior Publication Data

US 2022/0364399 A1 Nov. 17, 2022

(30) Foreign Application Priority Data

May 13, 2021 (CN) ......................... 202110521768.3

(51) Int. Cl.

| | |
|---|---|
| ***E05B 81/76*** | (2014.01) |
| ***E05B 81/04*** | (2014.01) |
| ***E05B 85/10*** | (2014.01) |

(52) U.S. Cl.

CPC ............ *E05B 85/107* (2013.01); *E05B 81/04* (2013.01)

(58) Field of Classification Search

CPC ....... E05B 81/04; E05B 85/103; E05B 85/107

See application file for complete search history.

(56) References Cited

U.S. PATENT DOCUMENTS

| | | | | |
|---|---|---|---|---|
| 6,485,081 | B1 | 11/2002 | Bingle et al. | |
| 10,655,371 | B2 * | 5/2020 | Soonthornwinate | E05B 79/06 |
| 10,815,702 | B2 * | 10/2020 | Yoshino | E05B 85/103 |
| 11,598,128 | B2 * | 3/2023 | Murata | E05B 81/16 |
| 2013/0056994 | A1 | 3/2013 | Sago | |

(Continued)

FOREIGN PATENT DOCUMENTS

| | | |
|---|---|---|
| CN | 101018921 | 8/2007 |
| CN | 202401851 | 8/2012 |

(Continued)

OTHER PUBLICATIONS

Extended Search Report for European Patent Application No. 22165069.0, dated Aug. 25, 2022, 7 pages.

(Continued)

*Primary Examiner* — Carlos Lugo

(74) *Attorney, Agent, or Firm* — Sheridan Ross P.C.

(57) ABSTRACT

The invention relates to a concealed door handle and a vehicle. The concealed door handle comprises: a handle body; a handle base fixed in a body of a vehicle, the handle body being concealed in the handle base, and the handle body being rotatably connected to the handle base; and a deployment microswitch arranged on the handle base and configured to detect a deployed position of the handle body and to maintain communication with a vehicle control module, wherein when the deployment microswitch jumps from a triggered state into an untriggered state, the deployment microswitch sends an input signal for unlocking an electronic lock to the vehicle control module. The concealed door handle of the invention has a simple structure and low costs, and a signal source can be arranged in a limited structural space.

8 Claims, 1 Drawing Sheet

(56) References Cited

U.S. PATENT DOCUMENTS

| | | | | |
|---|---|---|---|---|
| 2014/0132012 | A1 * | 5/2014 | Yoshino | E05B 85/103 292/336.3 |
| 2017/0089102 | A1 * | 3/2017 | Yoshino | E05B 77/32 |
| 2017/0314302 | A1 | 11/2017 | Marlia et al. | |
| 2018/0201187 | A1 | 7/2018 | Yellambalase et al. | |
| 2019/0291543 | A1 | 9/2019 | Couto Maquieira et al. | |
| 2020/0173204 | A1 * | 6/2020 | Murata | E05B 81/06 |

FOREIGN PATENT DOCUMENTS

| | | | | |
|---|---|---|---|---|
| CN | 105096412 | | 11/2015 | |
| CN | 204821473 | | 12/2015 | |
| CN | 106460419 | | 2/2017 | |
| CN | 207776636 | | 8/2018 | |
| CN | 108930464 | | 12/2018 | |
| CN | 109372335 | | 2/2019 | |
| CN | 110409940 | | 11/2019 | |
| CN | 112211510 | | 1/2021 | |
| DE | 102014107407 | | 11/2015 | |
| DE | 112018006590 | T5 * | 11/2020 | E05B 79/22 |
| EP | 3458663 | | 3/2019 | |
| JP | 2004-132025 | | 4/2004 | |
| JP | 2017166265 | A * | 9/2017 | |
| KR | 1998-0018261 | | 7/1998 | |
| WO | WO 2019/133524 | | 7/2019 | |
| WO | WO 2021/083523 | | 5/2021 | |

OTHER PUBLICATIONS

Official Action with Machine Translation for China Patent Application No. 202110521768.3, dated Mar. 19, 2024, 15 pages.

* cited by examiner

CONCEALED DOOR HANDLE AND VEHICLE

CROSS-REFERENCE TO RELATED APPLICATION

This application claims the benefit of China Patent Application No. 202110521768.3 filed May 13, 2021, the entire contents of which are incorporated herein by reference in its entirety.

TECHNICAL FIELD

The invention relates to the technical field of vehicle accessories, and in particular, to a concealed door handle and a vehicle.

BACKGROUND ART

With the popularization and development of the electrification of vehicles, the degrees of electrification and automation of vehicles are getting higher and higher. As a part that has the most contact with drivers and passengers on a daily basis, an exterior door handle of a vehicle has higher and higher requirements for appearance and automation. Concealed door handles are now widely used in many vehicles. For the vehicles using the concealed door handle technology, not only the appearance is neat and attractive appearance, vehicle doors are as smooth as a mirror visually, with no protruding handles, but also wind resistance and noise during driving are reduced.

To monitor and control deployed and retracted positions of the concealed door handle, the concealed door handle needs to send its own position state signal to a vehicle control unit or a domain controller in real time. Under normal operation conditions, an electronic lock can only be unlocked to open the door by using an electronic signal as an input. Only under emergency conditions, can the electronic lock be unlocked to open the door by means of a mechanical key and under the drive of a physical pull-wire. Therefore, it is necessary for the door handle to detect a manual operation of a user and send an electronic signal to the vehicle control unit or the domain controller.

At present, in the same vehicle model, there are two options for the arrangement of a concealed door handle used with an electronic lock. Specifically, in the first option, a Hall sensor is used to monitor a rotation angle of the concealed handle throughout the process. When the user operates the handle to turn to a certain angle, the vehicle control unit or the domain controller drives the electronic lock to be unlocked to open the door. However, for the Hall sensor in this solution, it is necessary to add a magnetic ring on a rotating shaft of the rotating structure to be monitored, and the number of magnetic poles of the magnetic ring is generally not greater than eight. Since one circle of rotation is 360°, even if a magnetic ring with 8 magnetic poles is used, the smallest unit that can be detected is 45°. Therefore, the detection accuracy is insufficient and cannot be applied to most scenarios (generally, the angle within which the concealed door handle can be manually operated from a deployed position to a release position does not exceed 15°). In order to solve the above problem and to accurately detect the small angle change of the concealed door handle, an additional rotation angle amplification mechanism is specially designed (for example, the rotation angle change is amplified by means of a gear or a gear set). Under the circumstance that the angle within which a handgrip of the concealed door handle can be manually operated does not exceed 15°, the additional rotation angle amplification mechanism can be designed to generate a larger angle change, and the Hall sensor may be arranged on the rotation angle amplification mechanism, so that every change by 45° of the rotation angle magnification mechanism can reflect the small angle change of the handgrip. However, this type of design essentially brings additional unnecessary elements that are not related to the implementation of the basic function, increasing the complexity of the part. In addition, the cost of the Hall sensor itself and the magnetic ring is high, and an additional PCB circuit is also required. Therefore, the first option has higher costs. Microswitches are used in the second option: multiple independent microswitches are respectively applied to determine the state of the handle, i.e. in the deployed or retracted position, and monitor the user pulling the door handle to a specific position as a drive signal for the electronic lock. Additional microswitches are used in the second option. Moreover, in this option, there is a need for an additional microswitch and wiring harness, so that more pin resources of the vehicle control unit or the domain controller are required.

Therefore, there is an urgent need to seek a concealed door handle to solve the above problems.

SUMMARY OF THE INVENTION

In view of this, according to a first aspect of the invention, there is provided a concealed door handle for effectively solving the above problems and other problems in the prior art. The concealed door handle comprises:

a handle body;

a handle base fixed in a body of a vehicle, the handle body being concealed in the handle base, and the handle body being rotatably connected to the handle base; and a deployment microswitch arranged on the handle base and configured to detect a deployed position of the handle body and to maintain communication with a vehicle control module, wherein when the deployment microswitch jumps from a triggered state into an untriggered state, the deployment microswitch sends an input signal for unlocking an electronic lock to the vehicle control module.

Optionally, in the concealed door handle as described above, the concealed door handle further comprises a retraction microswitch configured to detect a retracted position of the handle body and to maintain communication with the vehicle control module, the retraction microswitch being arranged on the handle base.

Optionally, in the concealed door handle as described above, the handle body has the retracted position, the deployed position and a release position in sequence as the position of a rear end of the handle body changes from inside to outside;

when the handle body is in the retracted position, the deployment microswitch is not triggered, and the retraction microswitch is triggered;

when the handle body is in the deployed position, the deployment microswitch is triggered, and the retraction microswitch is not triggered; and when the handle body is in the release position, neither the deployment microswitch nor the retraction microswitch is triggered.

Optionally, in the concealed door handle as described above, the handle body further comprises a fault state; and when the handle body is in the fault state, the deployment microswitch and the retraction microswitch are both triggered.

Optionally, in the concealed door handle as described above, the deployment microswitch comprises a microswitch trigger block, which has a recess configured for signal jump.

Optionally, in the concealed door handle as described above, the handle body has a contact face, which forms a contactable connection with a side face of the microswitch trigger block that has the recess.

Optionally, in the concealed door handle as described above, the microswitch trigger block is rotatable about a length direction of the handle base.

Optionally, in the concealed door handle as described above, when the deployment microswitch jumps from the triggered state into the untriggered state and sents the input signal for unlocking the electronic lock, the unlocking of an electronic door lock of the vehicle is commanded by the vehicle control module.

Optionally, in the concealed door handle as described above, the concealed door handle is a swing-out concealed door handle or a slide-out concealed door handle.

According to a second aspect of the disclosure, there is provided a vehicle comprising the concealed door handle described above.

It can be appreciated that the concealed door handle of the invention can not only simplify the structure of the part and reduce the number of sub-parts, but can also meet the same functional requirements with lower costs.

BRIEF DESCRIPTION OF THE DRAWINGS

The disclosure of the invention will become more readily understood with reference to the accompanying drawings. Those skilled in the art will readily appreciate that the accompanying drawings are merely for illustrative purposes and are not intended to limit the scope of protection of the invention. In addition, like components are indicated by like numbers in the figures, in which.

DETAILED DESCRIPTION OF EMBODIMENTS

In the disclosure, unless otherwise stated, the terms “first”, “second”, etc., used to describe various elements are not intended to limit the positional, temporal or importance relationship of these elements, but rather only to distinguish one component from the other. In some examples, the first element and the second element may refer to the same instance of the element, and in some cases, based on contextual descriptions, the first element and the second element may also refer to different instances.

The terms used in the description of the various examples in the disclosure are merely for the purpose of describing particular examples, and are not intended to be limiting. Unless the context clearly dictates otherwise, if the number of elements is not expressly limited, there may be one or more elements. In addition, as used in the disclosure, the term “and/or” encompasses any and all possible combinations of the listed items.

Figure 1:
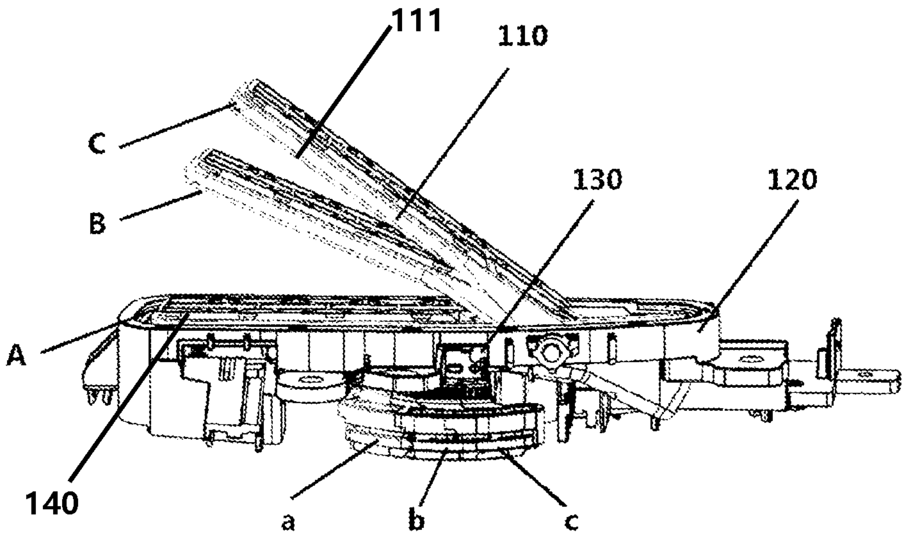
FIG. 1 is a schematic structural diagram showing a concealed door handle according to an exemplary embodiment of the invention.

A schematic structural diagram of a concealed door handle according to an embodiment of the invention is shown in FIG. 1. As shown in FIG. 1, the concealed door handle 100 is composed of a handle body 110, a handle base 120, a deployment mechanism comprising a deployment microswitch 130, and other components. The handle base 120 is fixed in a body of a vehicle. The handle body 110 is concealed in the handle base 120, and the handle body 110 is rotatably connected to the handle base 120. The deployment microswitch 130 is arranged on the handle base 120 and configured to detect a deployed position of the handle body 110 and to maintain communication with a vehicle control module. When the deployment microswitch 130 jumps from a triggered state into an untriggered state, the deployment microswitch 130 sends an input signal for unlocking an electronic lock to the vehicle control module. According to the concealed door handle of the invention, the state detection microswitch of the electric deployed position of the concealed door handle is also used as an signal input of the electronic lock for manually opening a door, and the two signals are advantageously obtained by the same mechanical structure, thereby simplifying the structure of the concealed door handle and reducing the number of parts.

In some embodiments of the invention, the concealed door handle further comprises a retraction microswitch 140 configured to detect a retracted position of the handle body 110 and to maintain communication with the vehicle control module. The retraction microswitch 140 is arranged on the handle base 120.

In some embodiments of the invention, the handle body 110 has the retracted position A, the deployed position B and a release position C in sequence as the position of a rear end of the handle body changes from inside to outside.

When the handle body 110 is in the retracted position A, the deployment microswitch 130 is not triggered, and the retraction microswitch is triggered. In this case, the handle body 110 is located in the handle base 120.

When the handle body 110 is in the deployed position B, the deployment microswitch 130 is triggered, and the retraction microswitch is not triggered. In this case, an operator pulls the handle body 110 to unlock the vehicle door.

When the handle body 110 is in the release position C, neither the deployment microswitch 130 nor the retraction microswitch is triggered. In this case, the retraction microswitch remains untriggered, and the deployment microswitch 130 jumping from the triggered state to the untriggered state is used as an input signal for unlocking the electronic lock.

In some embodiments of the invention, the handle body 110 further comprises a fault state.

When the handle body 110 is in the fault state, the deployment microswitch 130 and the retraction microswitch are both triggered. In this case, since the deployment microswitch 130 and the retraction microswitch are both triggered, the handle body 110 cannot operate normally.

Figure 2:
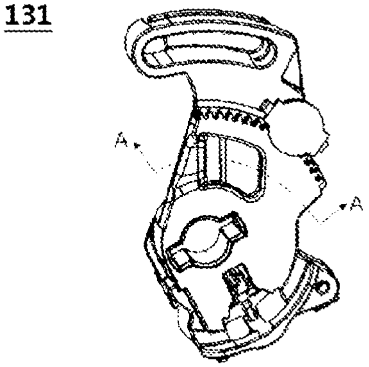
FIG. 2 is a schematic structural diagram showing a microswitch trigger block of a deployment microswitch according to an exemplary embodiment of the invention.
Figure 3:
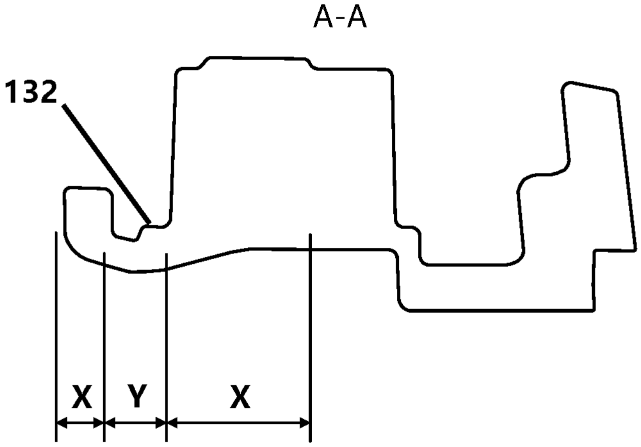
FIG. 3 is a cross-sectional view along A-A showing the microswitch trigger block according to the exemplary embodiment of the invention.

In some embodiments of the invention, the deployment mechanism comprises a microswitch trigger block 131 (see FIGS. 2 and 3), and the microswitch trigger block 131 has a distinct recess 132 configured for signal jump. As shown in FIG. 3, the microswitch trigger block 131 has a triggered region Y corresponding to the recess 132, and untriggered regions X.

In some embodiments of the invention, the handle body 110 has a contact face 111, which forms a contactable connection with a side face (the triggered region Y) of the microswitch trigger block 131 that has the recess 132.

In some embodiments of the invention, the micro switch trigger block 131 is rotatable about a length direction of the handle base. As shown in FIG. 1, the microswitch trigger block 131 has a microswitch trigger block retracted position a, a microswitch trigger block deployed position b and a microswitch trigger block release position c in sequence as the position of the rear end of the handle body changes from inside to outside.

In some embodiments of the invention, when the deployment microswitch jumps from the triggered state into the untriggered state and sents the input signal for unlocking the electronic lock, the unlocking of an electronic door lock of the vehicle is commanded by the vehicle control module.

According to a further aspect of the invention, there is also provided a vehicle. The vehicle of the embodiment of the invention may comprise the concealed door handle described above. According to some embodiments, the concealed door handle described above may be mounted on a vehicle door of the vehicle. In the above, as a non-limited example, the vehicle is considered to be a type of motor vehicle, for example, refers to a car, a coach, a truck, or a commercial vehicle. However, the invention is not limited to this type of vehicle. In conclusion, the concealed door handle according to the invention has the advantages of simplified structure and low costs, and effectively solves the problem of arranging a signal source in a limited structural space.

Several specific embodiments are listed above to detail the concealed door handle and the vehicle of the invention, and these examples are only for explaining the principle of the invention and its embodiments, and not limiting the invention; and those of ordinary skill in the art can make various modifications and improvements without departing from the spirit and scope of the invention. As an example, the concealed door handle is a swing-out concealed door handle or a slide-out concealed door handle. Therefore, all equivalent technical solutions should fall within the scope of the invention and be defined by the claims of the invention.

The invention claimed is:

1. A concealed door handle, comprising:

a handle body;

a handle base fixed in a body of a vehicle, the handle body being concealed in the handle base, and the handle body being rotatably connected to the handle base;

a deployment mechanism comprising a microswitch and microswitch trigger block, the microswitch arranged on the handle base and configured to detect a deployed position of the handle body and to maintain communication with a vehicle control module, wherein when the deployment microswitch is moved by the handle body from a triggered state into an untriggered state, the deployment microswitch sends an input signal for unlocking an electronic lock to the vehicle control module; and a retraction microswitch configured to detect a retracted position of the handle body and to maintain communication with the vehicle control module, the retraction microswitch being arranged on the handle base, wherein:

the handle body has the retracted position, the deployed position and a release position in sequence as the position of a rear end of the handle body changes from inside to outside, when the handle body is in the retracted position, the deployment microswitch is not triggered, and the retraction microswitch is triggered, when the handle body is in the deployed position, the deployment microswitch is triggered, and the retraction microswitch is not triggered, and when the handle body is in the release position, neither the deployment microswitch nor the retraction microswitch is triggered, then an input signal is sent for unlocking an electronic lock to the vehicle control module.

2. The concealed door handle according to claim 1, wherein the handle body further comprises a fault state; and when the handle body is in the fault state, the deployment microswitch and the retraction microswitch are both triggered.

3. The concealed door handle according to claim 1, wherein the microswitch trigger block comprises a recess configured to cause the microswitch to jump between the triggered state and the untriggered state.

4. The concealed door handle according to claim 3, wherein the handle body has a contact face, which forms a contactable connection with a side face of the microswitch trigger block that has the recess.

5. The concealed door handle according to claim 4, wherein the microswitch trigger block is rotatable about a length direction of the handle base.

6. The concealed door handle according to claim 1, wherein when the deployment microswitch jumps from the triggered state into the untriggered state and sends the input signal for unlocking the electronic lock, the unlocking of an electronic door lock of the vehicle is commanded by the vehicle control module.

7. The concealed door handle according to claim 1, wherein the concealed door handle is a swing-out concealed door handle or a slide-out concealed door handle.

8. A vehicle, comprising the concealed door handle according to claim 1.

* * * * *